United States Patent [19]

Freeman et al.

[11] 4,186,262
[45] Jan. 29, 1980

[54] AROMATIC POLYMERS HAVING PHENYLENE GROUPS LINKED BY OXYGEN ATOMS, KETO GROUPS AND SULPHONE GROUPS

[75] Inventors: John L. Freeman, St. Neots; John B. Rose, Letchworth, both of England

[73] Assignee: Imperial Chemical Industries Limited, London, England

[21] Appl. No.: 5,824

[22] Filed: Jan. 23, 1979

Related U.S. Application Data

[63] Continuation of Ser. No. 767,332, Feb. 10, 1977, now Defensive Publication No. T 966,006.

[30] Foreign Application Priority Data

Feb. 10, 1976 [GB] United Kingdom ............... 5173/76

[51] Int. Cl.² ................... C08G 65/40; C08G 75/23
[52] U.S. Cl. ................... 528/125; 528/128; 528/174
[58] Field of Search ............... 528/125, 128, 174

[56] References Cited

U.S. PATENT DOCUMENTS

| | | | |
|---|---|---|---|
| T 966,006 | 1/1978 | Freeman et al. | 528/125 |
| 4,010,147 | 3/1977 | Rose | 528/125 |
| 4,036,815 | 7/1977 | Feasey et al. | 528/125 |
| 4,052,365 | 10/1977 | Jones | 528/125 |
| 4,105,635 | 8/1978 | Freeman | 528/125 |
| 4,105,636 | 8/1978 | Taylor | 528/125 |
| 4,113,698 | 9/1978 | Staniland | 528/125 |
| 4,113,699 | 9/1978 | Rose et al. | 528/125 |

*Primary Examiner*—Lester L. Lee
*Attorney, Agent, or Firm*—Cushman, Darby & Cushman

[57] ABSTRACT

Copolymers containing 40 to 90 mole % of repeat units

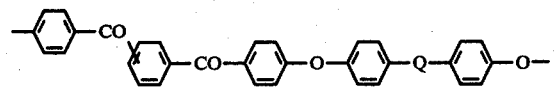

and correspondingly 10 to 60 mole % of repeat units

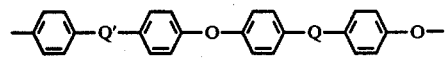

where Q and Q' are —SO$_2$— or —CO— and the number of —SO$_2$— groups is 3 to 25% of the total number of —SO$_2$— and —CO— groups.

8 Claims, No Drawings

AROMATIC POLYMERS HAVING PHENYLENE GROUPS LINKED BY OXYGEN ATOMS, KETO GROUPS AND SULPHONE GROUPS

CROSS REFERENCE TO RELATED APPLICATIONS

This application is a continuation of application Ser. No. 767,332 filed Feb. 10, 1977 now Defensive Publication No. T966,006, of Jan. 3, 1978.

This invention relates to aromatic polymers and in particular to aromatic polymers having phenylene groups linked by oxygen atoms, ketone groups and sulphone groups. Such polymers are hereinafter termed etherketone/sulphone polymers.

In our United Kingdom Pat. No. 1 414 422 we described certain copolymers having repeat units

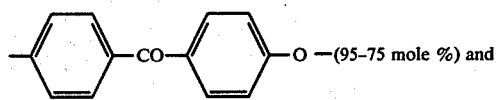 —(95–75 mole %) and

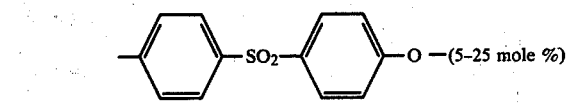 —(5–25 mole %)

These were said to be high melting crystalline polymers. The production of such polymers by nucleophilic condensation of a mixture of 4,4'-dichlorobenzophenone and 4,4'-dichlorodiphenylsulphone with a dialkali metal salt of 4,4'-dihydroxybenzophenone was also described.

4,4'-Dichlorobenzophenone is an expensive reactant. We have now found a class of etherketone/sulphone copolymers that have similar or, in some cases, superior, properties to the copolymers of United Kingdom specification No. 1 414 422 but which may be made more cheaply.

Accordingly we provide aromatic etherketone/sulphone copolymers containing 40 to 90 (particularly 50 to 80) mole % of repeat units

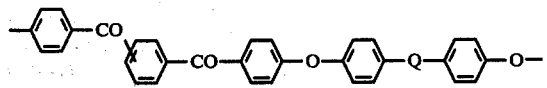

and correspondingly 10 to 60 (particularly 20 to 50) mole % of repeat units

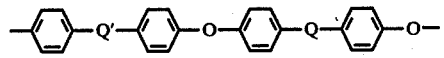

where Q and Q' are selected from —SO$_2$— and —CO—, the number of —SO$_2$— groups being 3 to 25% of the total number of —SO$_2$— and —CO— groups.

These copolymers may be prepared by nucleophilic condensation of at least one alkali metal bisphenate of formula

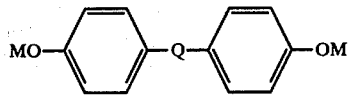

(where M is alkali metal, preferably sodium or potassium) with a substantially equimolar amount of a mixture of dihalo compound of the formula

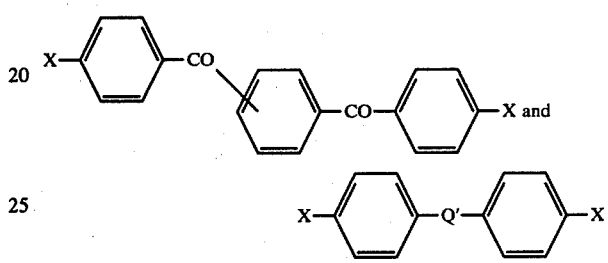

(where X is halogen, preferably chlorine or fluorine).

The procedure adopted is conveniently similar to that described in aforesaid U.K. patent specification No. 1,414,422. Thus 51 to 50% molar of the mixture of dihalo compounds is reacted with 49 to 50% molar of the bisphenate in finely divided form at 250° to 400° C. in the presence of an aromatic sulphone of formula

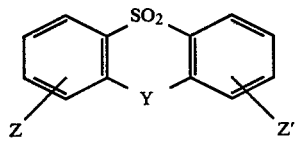

in which Y is a direct link, an oxygen atom or two hydrogen atoms (one attached to each benzene ring) and Z and Z' are hydrogen atoms or phenyl groups and may be the same or different. The preferred aromatic sulphone is diphenyl sulphone (Z, Z' and Y are hydrogen atoms).

The bisphenate may be a dialkali metal salt of 4,4'-dihydroxybenzophenone and/or 4,4'-dihydroxydiphenyl sulphone. For simplicity it is preferred that Q is only —CO—, i.e. the bisphenate is a dialkali metal salt of 4,4'-dihydroxybenzophenone alone.

This bisphenate thus gives the repeat units

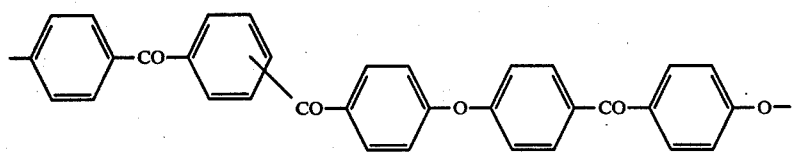

and

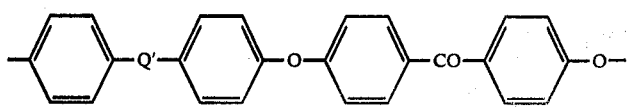

Accordingly, to give the appropriate proportion of —SO$_2$— linkages, some or all of the dihalo compound

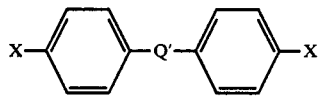

should be a 4,4'-dihalodiphenylsulphone.

Because of the expense of 4,4'-dihalobenzophenones, it is preferred that Q' is only —SO$_2$—, i.e. that the dihalo compound

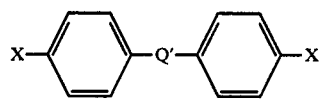

is a 4,4'-dihalodiphenylsulphone alone.

The copolymers of the present invention are thus conveniently made by nucleophilic polycondensation of a mixture of a bis-(4-halobenzoyl) benzene and a 4,4'-dihalodiphenylsulphone with a dialkali metal salt of 4,4'-dihydroxybenzophenone.

Equimolar proportions of the bis-(4-halobenzoyl) benzene and 4,4'-dihalodiphenylsulphone give rise to copolymers having 50 mole % of units

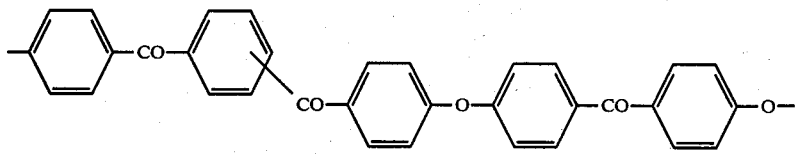

and 50 mole % of units

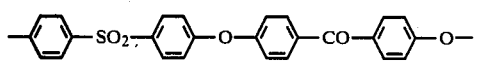

In such copolymers 20% of the total —SO$_2$— and —CO— groups are —SO$_2$— groups.

Correspondingly the use of a bis-(4-halobenzoyl) benzene and a 4,4'-dihalodiphenylsulphone in the molar ratio of 2:1 gives rise to copolymers containing 67% of

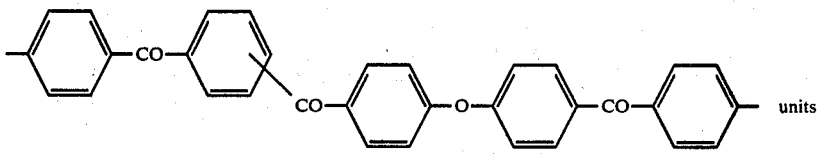

and 12.5% of the total —SO$_2$— and —CO— groups are —SO$_2$— groups.

The bis-(4-halobenzoyl) benzene is preferably the 1,3 or 1,4 isomer, particularly the latter. This may be made by Friedel Craft condensation of 2 moles of a halobenzene such as chlorobenzene with terephthaloyl chloride. The 1,4 isomer is preferred as its gives rise to the "all-para" polymer.

High molecular weight homopolymers of repeat unit

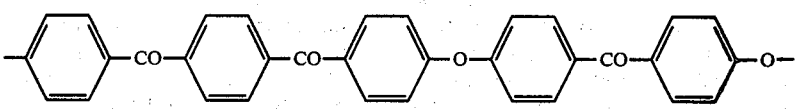

are known per se from Belgian Pat. No. 817 628 wherein their production by reaction of terephthaloyl chloride and 4,4'-diphenoxybenzophenone is described. We have found that such homopolymers, when obtained by nucleophilic condensation of a 1,4-bis-(4-halobenzoyl) benzene and a dialkali metal salt of 4,4'-dihydroxybenzophenone, have a crystalline melting point of about 384° C. They tend to decompose at temperatures of the order of 420° C. and hence there is only a relatively narrow temperature range at which they can be melt fabricated.

The incorporation of sulphone linkages in the polymer chain reduces the crystalline melting point thus providing greater latitude over processing temperatures.

Furthermore the homopolymer mentioned above has only a very limited solubility in the aromatic sulphone polymerisation solvent except at very high temperatures and hence, to make the high molecular weight homopolymer, very high polymerisation temperatures are required with the consequent risk of side reactions, particularly cross-linking, which render the polymer less readily fabricated. Incorporation of sulphone linkages increases the polymer solubility in the polymerisation solvent and hence enables lower polymerisation temperatures to be employed.

Copolymers in which about 7% of the total sulphone and ketone linkages are sulphone have melting points of about 360° C. while copolymers in which about 20% of the total sulphone and ketone linkages are sulphone have melting points of about 330° C.

Copolymers in which more than about 25% of the sulphone and ketone linkages are sulphone are less readily crystallisable and in fact may be wholly amorphous and hence not exhibit sufficient resistance to embrittlement upon exposure to organic solvents such as aircraft hydraulic fluids.

For these reasons we prefer that from 10 to 20% of the total sulphone and ketone linkages in the copolymers are sulphone linkages.

The copolymers of the present invention tend to exhibit higher glass/rubber transition temperatures (Tg) than the copolymers of U.K. patent specification No. 1 414 422 and hence may have higher useful service temperatures.

It will be appreciated that the copolymers can also be made by nucleophilic polycondensation of a mixture of bisphenates of formula

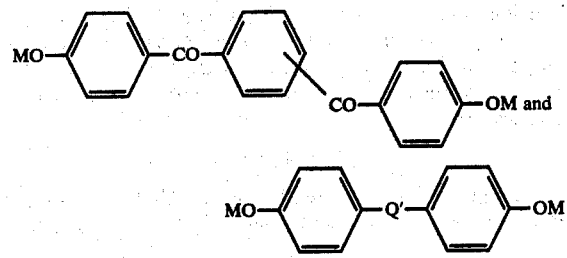

with dihalo compounds of the formula

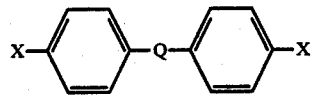

The copolymers can also be made by an electrophilic polycondensation reaction, for example by the techniques described in United Kingdom patent specifications Nos. 1,086,021 or 1,164,817, using approximately equimolar amounts of

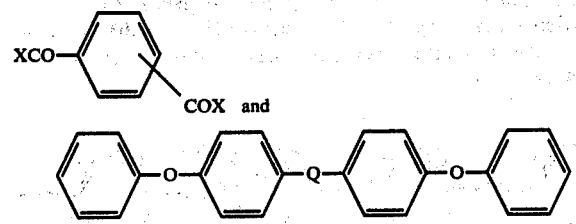

together with (i) an appropriate amount of the self condensable reactants a)

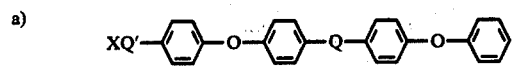

and/or
(b) a mixture of

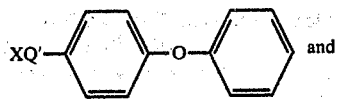

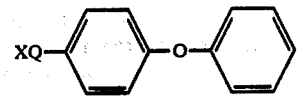

or with (ii) an approximately equimolar amount of

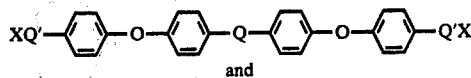

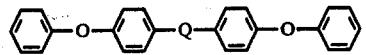

The copolymers of the present invention are of particular utility in applications such as wire insulation where the polymer has a retain its properties at high service temperatures.

To be of practical use, the copolymers preferably have a reduced viscosity of at least 0.8, particularly at least 1.0. [Reduced viscosities are measured herein at 25° C. on a solution of polymer in concentrated sulphuric acid (specific gravity 1.84) containing 1 g of polymer in 100 cm$^3$ of solution.]

The copolymers also preferably have a low absorbance, particularly below 0.35.

[Absorbances are measured herein at a wavelength of 550 nm in a 1 cm cell using a solution of polymer in concentrated sulphuric acid as used for reduced viscosity measurements.]

A low absorbance is indicative of relative freedom from structural irregularities such as chain branching. For copolymers of given reduced viscosity, those having a low absorbance tend to give tougher films than those of higher absorbance.

EXAMPLE 1

A sample of hydrated dipotassium salt of 4,4'-dihydroxybenzophenone, finely ground to pass through a sieve having a mesh opening of 500 μm, was estimated by titration against a standard solution of sulphuric acid in a mixture of equal volumes of methanol and water. Accordingly a sample (0.0648 mol) of the ground hydrated dipotassium salt was weighed into a glass flask of capacity 250 cm$^3$ fitted with a stirrer, nitrogen purge and an air condenser. Diphenyl sulphone (40 g; melting point 124° to 125.5° C., recrystallised from methanol) was introduced into the flask and powder blended with the dipotassium salt. The flask was flushed with nitrogen and heated on a solder bath at 230° C. As the diphenyl sulphone melted, the stirrer was started, the nitrogen purge commenced, and the pressure in the flask reduced slowly to 50 torr. Water distilled from the mixture and a lemon-yellow slurry of the dipotassium salt in diphenyl sulphone remained in the flask. Care was taken to ensure that the diphenyl sulphone did not boil and hence did not splash the dipotassium salt on to the upper walls of the flask. The apparatus was then filled with nitrogen and the pressure therein increased to atomspheric.

1,4-bis-(4-chlorobenzoyl) benzene (13.8898 g; 0.0391 mol); 4,4'-dichlorodiphenylsulphone (7.4858 g; 0.0261 mol); and recrystallised diphenyl sulphone (9 g) were added to the flask.

[The dihalo compounds comprised 50.15 mol % of the reactants (i.e. dihalo compounds plus bisphenate) charged, and the 4,4'-dichlorodiphenylsulphone 40 mol % of the dihalo compounds.]

A bubbler was fitted to the air condenser and the slurry was heated under nitrogen with stirring for 2 hours at 230° C., then 18 hours at 260° C. and finally 1½ hours at 320° C. To end stop the reaction 4,4'-dichlorodiphenyl sulphone (1 g) was then added to the solution which was then stirred at 320° C. for a further hour. The reaction mixture was cooled to room temperature, ground, extracted by boiling twice with acetone, once with 1% acetic acid, once with water, then with a mixture of equal volumes of methanol and acetone, and finally dried at 140° C. for 24 hours at 100 torr.

A sample of the polymer was dissolved in concentrated sulphuric acid to give a pale orange solution, (absorbance of 0.21; reduced viscosity of 2.40) that was free from gelatinous material.

The polymer consisted of units of the formula

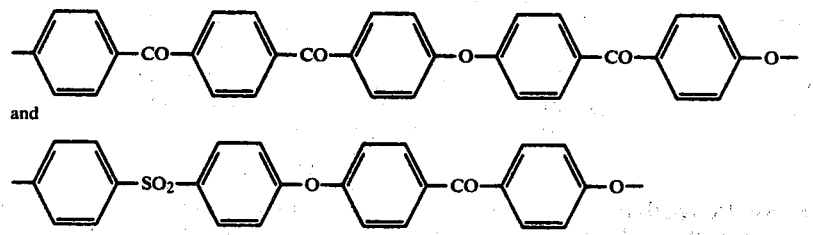

in the molar ratio 3:2, and so about 15.4% of the —CO— and —SO$_2$— linking groups were —SO$_2$—.

The polymer powder was pressed, using an electrically heated press at 400° C. and 20 tonnes pressure on a 10 cm diameter ram, into an opaque, tough film.

The crystalline melting point, Tm, was 341° C. and the glass/rubber transition temperature, Tg, was 174° C.

[Tm and Tg were measured herein by differential scanning calorimetry using a heating rate of 16° C. per minute.]

EXAMPLE 2

Example 1 was repeated but using 0.0656 mol of the hydrated dipotassium salt of 4,4'-dihydroxybenzophenone; 18.7352 g (0.0527 mol) of 1,4-bis-(4-chlorobenzoyl) benzene; 3.786 g (0.0132 mol) of 4,4'-dichlorodiphenyl sulphone; and a total of 51 g diphenyl sulphone. The dihalo compounds comprised 50.11 mol % of the reactants charged and the 4,4'-dichlorodiphenylsulphone 20 mol % of the dihalo compounds.

The resultant polymer contained the repeat units

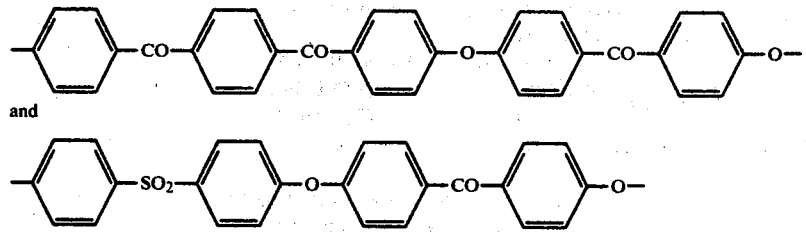

in the molar ratio 4:1 and so about 7.1% of the —CO— and —SO$_2$— linking groups were —SO$_2$—. The polymer had a reduced viscosity of 1.41, and an absorbance of 0.27. The polymer could be pressed as in Example 1 into tough film. The crystalline melting point, Tm, was 360° C. while the glass/rubber transition temperature, Tg, was 165° C.

EXAMPLE 3

Example 1 was repeated but using 0.0667 mol of the hydrated dipotassium salt of 4,4'-dihydroxybenzophenone; 11.9027 g (0.0335 mol) of 1,4-bis-(4-chlorobenzoyl) benzene; and 9.6224 g (0.0335 mol) of 4,4'-dichlorodiphenyl sulphone; and a total of 50 g of diphenyl sulphone. The dihalo compounds comprised 50.11 mol % of the reactants charged and the 4,4'-dichlorodiphenylsulphone 50 mol % of the dihalo compounds. The resultant polymer contained the repeat units

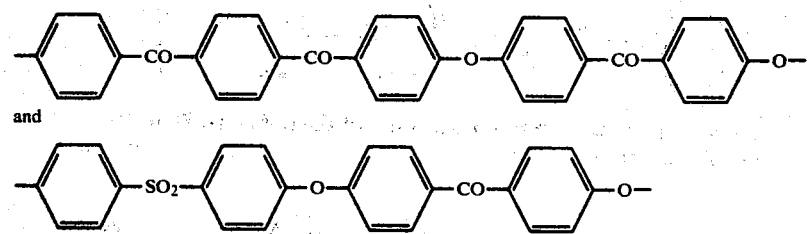

in the molar ratio 1:1, and so about 20% of the —CO— and —SO$_2$— linking groups were —SO$_2$—.

The polymer had a reduced viscosity of 1.85 and an absorbance of 0.22, and could be pressed, as in Example 1, into tough films.

The crystalline melting point, Tm, was 333° C. while the glass/rubber transition temperature, Tg, was 177° C.

By way of comparison, in Examples 4 to 9 below, various other polymers containing the

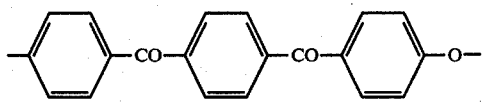

unit as part (or all) of the repeat unit are described.

EXAMPLE 4

25.4604 g (0.0828 mol) of a hydrated dipotassium salt of 4,4'-dihydroxybenzophenone was dehydrated and polymerised with 29.5793 g (0.0833 mol) of 1,4-bis-(4-chlorobenzoyl) benzene as the sole dihalo compound by a procedure similar to that of Example 1, employing a total of 64 g of diphenyl sulphone.

[The dihalo compound comprised 50.15 mole % of the condensants charged.]

The prepolymerisation was conducted for seven hours at 230° C. and polymerisation for four hours at 320° to 350° C.; the temperature being increased to 350° C. as polymerisation ensued to maintain the polymer in solution.

No end stopping reagent was added and the polymerisation terminated by cooling the reaction mixture. The cooled reaction mixture was milled to a particle size of less than 1 mm and worked up by boiling three times with acetone (500 ml; 10 min); once with dilute aqueous acetic acid (500 ml water + 10 ml acetic acid; 20 min); once with water (500 ml; 20 min); and finally once with acetone (500 ml; 15 min). The resultant polymer powder was dried at 140° C. for 24 hours at 100 torr.

The polymer consisted of repeat units of formula

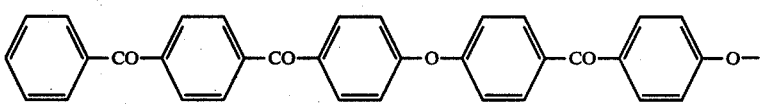

and dissolved in concentrated sulphuric acid to give a red solution (absorbance >1.0; reduced viscosity 1.19) containing gel.

Film made by the procedure of Example 1, and slow cooled from 400° C., was crystalline, opaque and brittle. The crystalline melting point, Tm, was 384° C.

EXAMPLE 5

26.4713 g (0.0170 mol) of a hydrated dipotassium salt of 4,4'-dihydroxydiphenyl sulphone was dehydrated and polymerised with 25.3641 g (0.0714 mol) of 1,4-bis-(4-chlorobenzoyl) benzene as the sole dihalo compound by a procedure similar to that of Example 1, employing a total of 62 g of diphenyl sulphone.

[The dihalo compound comprised 50.14 mol % of the condensants charged.]

The prepolymerisation was conducted for seven hours at 260° C. and polymerisation for one hour at 320° C. No end stopping reagent was added and the polymerisation terminated by cooling the reaction mixture. The cooled reaction mixture was milled to a particle size of less than 1 mm and worked up by boiling twice with acetone (500 ml; 10 min); once with dilute aqueous acetic acid (500 ml water + 5 ml acetic acid; 10 min); once with water (500 ml; 30 min); and finally once with acetone (500 ml; 10 min). The resultant polymer powder was dried at 140° C. for 24 hours at 50 torr.

The polymer consisted of repeat units of formula

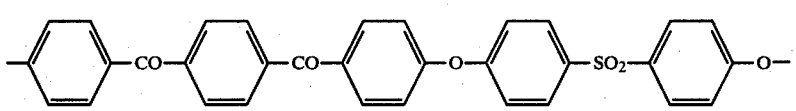

and had an absorbance of 0.25 and a reduced viscosity of 1.83. The polymer powder was of moderately low crystallinity and had a crystalline melting point, Tm, of 284° C.

Film made by the technique of Example 1 with slow cooling from 400° C. to 200° C. was amorphous, transparent and very tough having a Tg of 185° C. It became opaque when boiled in xylene for 30 min and then exhibited poor crystallinity (Tm 273° C.).

EXAMPLE 6

30.1680 g (0.0899 mol) of a hydrated mixture of equimolar amounts of the dipotassium salts of 4,4'-dihydroxybenzophenone and 4,4'-dihydroxydiphenyl sulphone was dehydrated and polymerised with 32.0879 g (0.0903 mole of 1,4-bis-(4-chlorobenzoyl) benzene as the sole dihalo compound by a procedure similar to that of Example 1 employing a total of 75 g of diphenyl sulphone.

[The dihalo compound comprised 50.11 mole % of the condensants charged.]

The reactants were prepolymerised for 15½ hours at 240° C. and polymerised for 3½ hours at 300° to 320° C. (the temperature was increased to keep the polymer in solution as polymerisation proceeded). The polymerisation was terminated by adding 2 g of 4,4'-dichlorodiphenyl sulphone and heating at 320° C. for a further ½ hour. After cooling and grinding the reaction mixture, it was worked up by boiling twice with acetone (500 ml), once with dilute aqueous acetic acid (500 ml water + 5 ml acetic acid), once with water (500 ml), and then with methanol (500 ml). The resultant product was then Soxhlet extracted for 17 hours with acetone and then seven hours with methanol and then dried at 140° C. for 24 hours at 100 torr.

A sample of the polymer was dissolved in concentrated sulphuric acid to give an orange solution (absorbance 0.30; reduced viscosity 1.00).

The polymer consisted of units of the formula

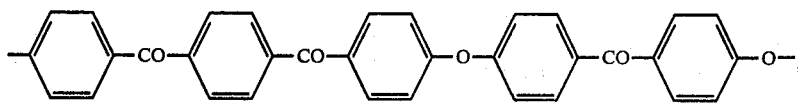
and

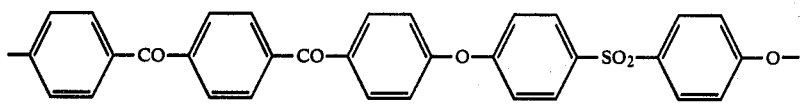

in the molar ratio 1:1 and so about 16.7% of the —CO— and —SO$_2$— linking groups were —SO$_2$—.

The melt stability of the polymer, stabilised with 0.2% by weight triphenyl phosphate, was assessed by melt extrusion at a shear rate of 125 sec$^{-1}$. At 380° C. no increase in melt viscosity (0.83 kNsm$^{-2}$) was observed over a period of 40 minutes whereas at 400° C. the melt viscosity increased from 0.42 to 2.18 kNsm$^{-2}$ over a period of 40 minutes.

EXAMPLE 7

Example 6 was repeated using a mixture of 3.4949 g (0.01076 mol) of a hydrated dipotassium salt of 4,4'-dihydroxybenzophenone and 12.0275 g (0.03228 mol) of a hydrated dipotassium salt of 4,4'-dihydroxydiphenyl sulphone in place of the equimolar mixture thereof. 15.3658 g (0.04326 mol) of 1,4-bis-(4-chlorobenzoyl) benzene and a total of 37 g of diphenyl sulphone were employed.

[The dihalo compound comprised 50.13 mol % of the condensants charged.]

Prepolymerisation was conducted for four hours at 230° C. and polymerisation 2½ hours at 320° C. The resultant polymer which consisted of the units

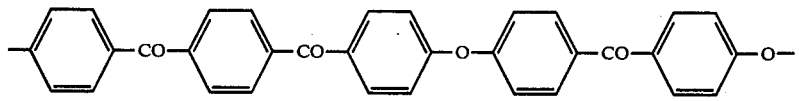
and

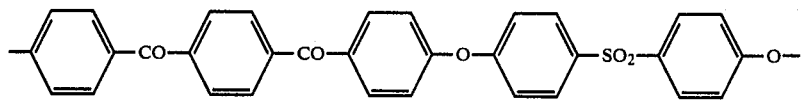

in the molar ratio 1:3 ( and thus about 25% of the —CO— and —SO$_2$— links were —SO$_2$—) had an absorbance of 0.48 and a reduced viscosity of 1.16.

Film made as in Example 1, with rapid cooling from 400° C. to 150° C. was tough and transparent but became opaque, i.e. crystalline, upon annealing at 260° C.

EXAMPLE 8

19.4556 g (0.0447 mol) of a hydrated dipotassium salt of 1,4-bis-(4-hydroxybenzoyl) benzene was dehydrated and polymerised with 15.9768 g (0.0450 mol) of 1,4-bis-(4-chlorobenzoyl) benzene as the sole dihalo compound by a procedure similar to that of Example 1, employing a total of 43 g of diphenyl sulphone.

[The dihalo compound comprised 50.17 mol % of the condensants charged.]

The reaction mixture was prepolymerized for 22 hours at 230° C. to give a thick unstirrable brown paste and then polymerised for two hours at 320° to 360° C.; the temperature being gradually raised to 360° C. as polymerisation ensued to keep the polymer in solution. No end stopping reagent was added and the polymerisation terminated by cooling the mixture.

The cooled reaction mixture was ground and worked up by the procedure of Example 4.

The polymer, which consisted of units of the formula

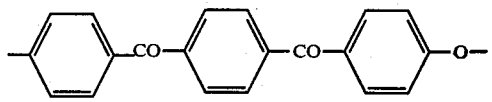

was pressed, as in Example 1, with slow cooling from 400° C. to give a crystalline opaque brittle film. The film, which could not be made amorphous, had a Tm of 384° C.

A solution of the polymer in concentrated sulphuric acid contained gel and was unfilterable.

EXAMPLE 9

The procedure of Example 8 was repeated but using 19.5911 g (0.0451 mol) of a hydrated dipotassium salt of 1,4-bis-(4-hydroxybenzoyl) benzene and a mixture of 8.0438 g (0.0226 mol) of 1,4-bis-(4-chlorobenzoyl) benzene and 6.5028 g (0.0226 mol) of 4,4'-dichlorodiphenyl sulphone as the condensants. The total amount of diphenyl sulphone employed was 41 g.

[The dihalo compounds comprised 50.06 mol % of the condensants charged; and 4,4'-dichlorodiphenyl sulphone 50 mol % of the dihalo compounds.]

The prepolymerisation period at 230° C. was 21 hours and the polymerisation period was 4 hours at 320° C. increasing to 328° C.

The resultant polymer consisted of units of the formula

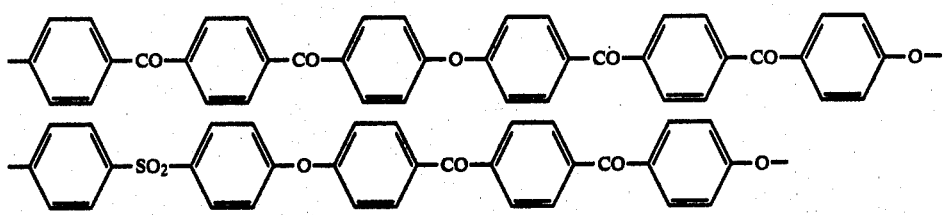

in the molar ratio 1:1 and so about 14% of the —SO₂— and —CO— links were —SO₂—. The polymer dissolved in concentrated sulphuric acid to give a deep red solution (absorbance approximately 1.0; reduced viscosity 1.84).

Film prepared by the technique of Example 1 employing slow cooling from 400° C. was crystalline, opaque and brittle. Tm was 359° C.

We claim:

1. An aromatic etherketone/sulphone copolymer containing 40 to 90 mole % of the repeat units

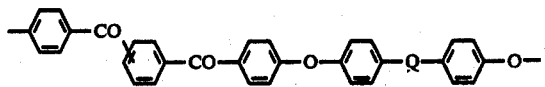

and correspondingly 10 to 60 mole % of the repeat units

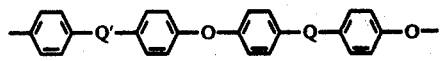

where Q and Q' are selected from —SO₂— and —CO—, the number of —SO₂— groups being 3 to 25% of the total number of —SO₂— and —CO— groups.

2. A copolymer according to claim 1 wherein the number of —SO₂— groups is 10 to 20% of the total number of —SO₂— and —CO— groups.

3. A copolymer according to claim 1 containing 50 to 80 mole % of the repeat units

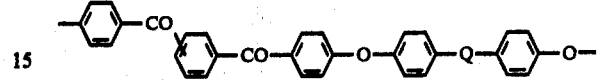

and correspondingly 50 to 20 mole % of the repeat units

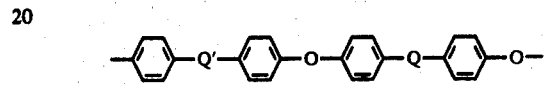

4. A copolymer according to claim 1 wherein Q is —CO—.

5. A copolymer according to claim 1 wherein the repeat units

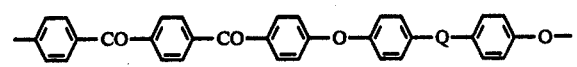

are of the formula

6. A copolymer according to claim 1 having a reduced viscosity of at least 0.8 as measured at 25° C. on a solution of polymer in concentrated sulphuric acid (specific gravity 1.84) containing 1 g of polymer in 100 cm³ of solution.

7. A copolymer according to claim 6 having a reduced viscosity, measured as specified therein, of at least 1.0.

8. A copolymer according to claim 1 having an absorbance of less than 0.35 as measured at a wavelength of 550 nm in a 1 cm cell using a solution of polymer in concentrated sulphuric acid (specific gravity 1.84) containing 1 g of polymer in 100 cm³ of solution.

* * * * *